United States Patent
Shpak

(10) Patent No.: US 10,182,315 B2
(45) Date of Patent: Jan. 15, 2019

(54) IDENTIFYING ANGLE OF DEPARTURE OF MULTI-ANTENNA TRANSMITTERS

(71) Applicant: Eran Shpak, Tel Aviv (IL)

(72) Inventor: Eran Shpak, Tel Aviv (IL)

(73) Assignee: DEEYOOK LOCATION TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 15/270,010

(22) Filed: Sep. 20, 2016

(65) Prior Publication Data

US 2018/0084386 A1    Mar. 22, 2018

(51) Int. Cl.

| | |
|---|---|
| *H04W 4/02* | (2018.01) |
| *H04L 5/12* | (2006.01) |
| *H04L 29/06* | (2006.01) |
| *H04B 7/06* | (2006.01) |
| *H04L 27/26* | (2006.01) |
| *H04W 88/08* | (2009.01) |
| *H04W 84/12* | (2009.01) |
| *H04W 88/02* | (2009.01) |

(52) U.S. Cl.
CPC .......... *H04W 4/026* (2013.01); *H04B 7/0671* (2013.01); *H04L 5/12* (2013.01); *H04L 27/2662* (2013.01); *H04L 69/22* (2013.01); *H04L 27/2601* (2013.01); *H04W 84/12* (2013.01); *H04W 88/02* (2013.01); *H04W 88/08* (2013.01)

(58) Field of Classification Search
CPC ..................................................... H04W 4/026
USPC ........................................... 455/456.6, 456.1
See application file for complete search history.

(56) References Cited

U.S. PATENT DOCUMENTS

| | | |
|---|---|---|
| 7,586,880 B2 | 9/2009 | Proctor, Jr. |
| 8,179,816 B1 | 5/2012 | Vaidvanathan et al. |
| 8,274,425 B2 | 9/2012 | Yeary et al. |
| 8,723,729 B2 | 5/2014 | Desai et al. |
| 9,220,081 B2 | 12/2015 | Prechner et al. |
| 9,814,051 B1 | 11/2017 | Shpak et al. |

(Continued)

FOREIGN PATENT DOCUMENTS

CN      103945331 A      7/2014

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", 536 pages, Oct. 29, 2009.

(Continued)

*Primary Examiner* — Chuck Huynh
(74) *Attorney, Agent, or Firm* — D. Kligler IP Services Ltd.

(57) ABSTRACT

A method for signal processing includes receiving at a given location at least first and second signals transmitted respectively from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

32 Claims, 4 Drawing Sheets

(56) References Cited

U.S. PATENT DOCUMENTS

| | | |
|---|---|---|
| 2008/0248741 A1 | 10/2008 | Alizadeh-Shabdiz |
| 2009/0243932 A1 | 10/2009 | Moshfeghi |
| 2012/0064912 A1 | 3/2012 | Oh |
| 2012/0178471 A1 | 7/2012 | Kanulanen et al. |
| 2012/0289241 A1 | 11/2012 | Kalliola et al. |
| 2014/0070996 A1 | 3/2014 | Kneckt et al. |
| 2014/0098682 A1 | 4/2014 | Cao et al. |
| 2014/0335891 A1* | 11/2014 | Zhang ................. H04W 64/003 455/456.1 |
| 2015/0189619 A1 | 7/2015 | Kalliola et al. |
| 2015/0268326 A1 | 9/2015 | Sung |
| 2016/0033614 A1* | 2/2016 | Wang ....................... G01S 3/46 342/378 |
| 2016/0103199 A1 | 4/2016 | Rappaport |
| 2016/0334498 A1 | 11/2016 | Jamieson et al. |
| 2016/0366548 A1 | 12/2016 | Wang et al. |
| 2017/0212204 A1 | 7/2017 | Amizur et al. |

OTHER PUBLICATIONS

Kotaru et al., "SpotFi: Decimeter Level Localization Using WiFi", SIGCOMM '15, London, UK, pp. 269-282, Aug. 17-21, 2015.

Mensing, C., "Location Determination in OFDM Based Mobile Radio Systems", Munich Technical University, 123 pages, Jun. 14, 2012.

Tzur et al., "Direction Finding of rogue Wi-Fi access points using an off-the-shelf MIMO-OFDM receiver", Physical Communication, vol. 17, pp. 149-164, year 2015.

U.S. Appl. No. 15/385,965 Office Action dated Apr. 7, 2017.

International Application # PCT/IB2017/055514 search report dated Dec. 28, 2017.

\* cited by examiner

IDENTIFYING ANGLE OF DEPARTURE OF MULTI-ANTENNA TRANSMITTERS

FIELD OF THE INVENTION

The present invention relates generally to wireless communication systems, and particularly to methods for localization based on wireless network signals.

BACKGROUND

Various techniques are known in the art for finding the location of a mobile wireless transceiver, such as a cellular telephone. For example, nearly all cellular telephones now have a Global Positioning System (GPS) receiver, which derives location coordinates from signals received from geostationary satellites. Because of its dependence on weak satellite signals, however, GPS works poorly, if at all, indoors and in crowded urban environments. Cellular networks are also capable of triangulating telephone location based on signals received or transmitted between the cellular telephone and multiple cellular antennas, but this technique is inaccurate and unreliable.

A number of methods have been proposed for indoor localization based on an existing wireless local area network (WLAN) infrastructure. One such approach is described, for example, by Kotaru et al., in "SpotFi: Decimeter Level Localization using WiFi," published in SIGCOMM '15 (London, UK, Aug. 17-21, 2015). According to the authors, SpotFi computes the angle of arrival (AoA) of multipath components received from access points, and uses filtering and estimation techniques to identify the AoA of a direct path between the localization target and the access point.

As another example, U.S. Patent Application Publication 2009/0243932 describes a method for determining the location of a mobile device. The method comprises transmitting a signal between a plurality of known locations and receiving the signal at a device of unknown location, such as a mobile device. The signal may include multiple tones having different frequencies and resulting in sets of residual phase differences. The location of the mobile device may be determined using the known locations and the frequency and phase differences between the transmitted tones. In one embodiment, OFDM signals may be used between an access point and mobile device to determine the location of the mobile device.

As a further example, U.S. Patent Application Publication 2016/0033614 describes a method of direction finding (DF) positioning involving main lobe and grating lobe identification in a wireless communication network is proposed. A receiver performs the DF algorithm on radio signals associated with multiple antennas over a first channel frequency and estimates a first set of DF solutions. The receiver performs the DF algorithm on radio signals associated with multiple antennas over a second channel frequency and estimates a second set of DF solutions. The receiver then identifies the correct DF solution (e.g., the main lobe direction) by comparing the first set of DF solutions and the second set of DF solutions.

Most current WLANs operate in accordance with the set of 802.11 standards promulgated by the IEEE. Within this family, the IEEE 802.11n-2009 standard (commonly referred to simply as "802.11n") defines the use of multiple antennas to increase data rates by means of "multiple input and multiple output" (MIMO) transmission and reception. MIMO enables the transmitter and receiver to coherently resolve more information than would be possible using a single antenna, by means of spatial division multiplexing (SDM), which spatially multiplexes multiple independent data streams within one spectral channel of bandwidth. The newer 802.11ac standard similarly supports MIMO transmission, with a larger number of spatial streams and higher transmission rates than 802.11n.

SUMMARY

Some embodiments of the present invention that are described hereinbelow provide improved methods for extracting directional information from wireless access point signals, as well as devices and systems that derive and make use of such information.

There is therefore provided, in accordance with an embodiment of the invention, a method for signal processing, which includes receiving at a given location at least first and second signals transmitted respectively from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

In some embodiments, receiving the at least first and second signals includes receiving at least the first and second signals via a single receiving antenna, such as an omnidirectional antenna installed in a mobile telephone.

Additionally or alternatively, the multi-carrier encoding scheme includes an orthogonal frequency-domain multiplexing (OFDM) scheme. In some embodiment, the transmitter is a wireless access point operating in accordance with an 802.11 standard.

In the disclosed embodiments, processing the received first and second signals includes selecting at least two time-frequency bins in the received signals, and computing the measure of the phase delay responsively to respective cyclic shifts of the selected bins. In some embodiments, selecting the at least two time-frequency bins includes sampling first and second bins at a selected frequency within the multi-carrier encoding scheme in different, respective first and second symbols within a frame transmitted by the transmitter. In other embodiments, selecting the at least two time-frequency bins includes sampling first and second bins at different, respective first and second frequencies within the multi-carrier encoding scheme in a selected symbol within a frame transmitted by the transmitter.

In a disclosed embodiment, selecting the at least two time-frequency bins includes selecting first and second bins having antipodal phases based on standard cyclic shifts. Additionally or alternatively, computing the measure of the phase delay includes applying a linear transformation to the signals extracted from the selected time-frequency bins.

In some embodiments, the first and second signals are transmitted in accordance with a wireless communication standard that specifies a frame structure including a predefined preamble, and processing the received first and second signals includes selecting at least a part of the preamble of a given frame for processing.

Additionally or alternatively, receiving and processing the at least first and second signals include receiving and processing at least the first and second signals in a mobile station without establishing an association between the mobile station and the access point. In one embodiment, receiving and processing at least the first and second signals includes receiving a beacon transmitted from the at least first and second antennas in accordance with a predefined wireless communication standard.

In some embodiments, the method includes receiving location information with respect to the wireless access point, and computing coordinates of the given location based on the received location information and the estimated angle of departure. Typically, computing the coordinates includes finding the coordinates based on the received location information and the estimated angle of departure with respect to two or more different wireless access points.

Additionally or alternatively, the method includes extracting an identifier of the wireless access point from at least one of the received first and second signals. In one embodiment, the method includes reporting the identifier and the estimated angle of departure to a server, for incorporation into a map containing respective locations of multiple access points.

There is also provided, in accordance with an embodiment of the invention, a method for mapping, which includes receiving reports, from a set of wireless communication devices at respective locations, of respective estimated angles of departure of signals received by the wireless communication devices from wireless access points. A map of the wireless access points is constructed based on the estimated angles of departure.

In a disclosed embodiment, the wireless communication devices include mobile stations having a single antenna, while the wireless access points each have multiple antennas, and the angles of departure are estimated based on a predefined cyclic delay between the signals transmitted by the multiple antennas.

Additionally or alternatively, receiving the reports includes receiving from the wireless communication devices respective identifiers of the wireless access points and location coordinates of the wireless communication devices where the signals were received.

In some embodiments, the method includes providing location information from the map to one or more of the wireless communication devices. In one embodiment, providing the location information includes identifying position coordinates of a wireless communication device based on an estimated angle of departure of signals received by the wireless communication devices from a given access point and a location of the given access point in the map.

There is additionally provided, in accordance with an embodiment of the invention, a wireless device, including a receive antenna, configured to receive at a given location at least first and second signals transmitted respectively from at least first and second antennas of a wireless transmitter. The at least first and second signals encode identical data using a multi-carrier encoding scheme with a predefined cyclic delay between the transmitted signals. Processing circuitry is configured to process the received first and second signals, using the cyclic delay, in order to derive a measure of a phase delay between the first and second signals, and to estimate, based on the measure of the phase delay, an angle of departure of the first and second signals from the wireless access point to the given location.

There is further provided, in accordance with an embodiment of the invention, apparatus for mapping, including a memory and a processor, which is configured to receive reports, from a set of wireless communication devices at respective locations, of respective estimated angles of departure of signals received by the wireless communication devices from wireless access points, and to construct, in the memory, a map of the wireless access points based on the estimated angles of departure.

The present invention will be more fully understood from the following detailed description of the embodiments thereof, taken together with the drawings in which:

DETAILED DESCRIPTION OF EMBODIMENTS

Overview

Figure 1:
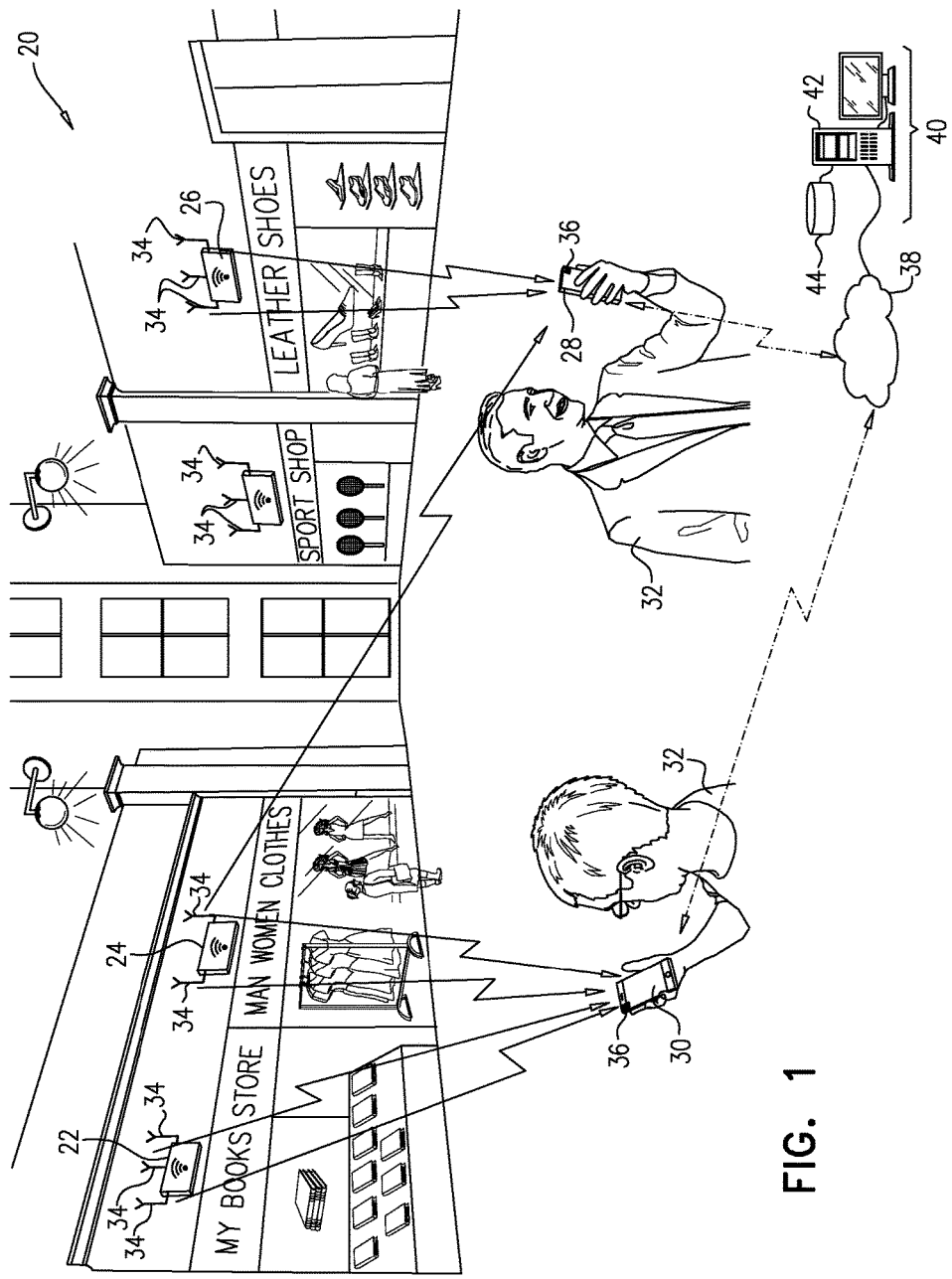
FIG. 1 is schematic, pictorial illustration of a system for wireless communications and position finding, in accordance with an embodiment of the invention.

Implementation of MIMO SDM schemes, such as those defined by the 802.11n standard, requires a discrete antenna at both the transmitter and the receiver for each spatial stream. Alternatively, the phases of the streams can be adjusted to enable directional beamforming between the access point and mobile station, thus maximizing the signal at the receiver. Many mobile devices, however, such as WiFi-enabled smartphones, have only a single, omnidirectional antenna, and thus cannot themselves support MIMO or directional transmission.

In addition to actively forming beams toward the receiver, the 802.11n standard also defines a scheme for preventing unintentional beamforming, which can occur if the data transmitted in the various spatial streams inadvertently form correlated patterns, for example if the number of streams is smaller than the number of antennas. Unlike intentional beamforming, the pattern of lobes and nulls created by unintentional beamforming may not be oriented in such a way as to maximize the signal at the receiver, and thus can be detrimental to reception. To avoid unintentional beamforming, the 802.11n standard applies a cyclic delay diversity (CDD) to offset the IFFT coded data stream from each antenna by a different constant, non-coherent delay. In the multi-carrier modulation system mandated by the 802.11n standard—known as orthogonal frequency domain multiplexing (OFDM)—CDD is applied by adding a predefined cyclic shift in time which affects each carrier on each antenna and is referred to equivalently as cyclic shift diversity (CSD).

Although CDD was introduced as a means for avoiding undesired directionality of multi-antenna wireless signals, embodiments of the present invention that are described herein exploit the CDD in received signals for just the opposite purpose: to estimate the angular orientation of the access point transmitting the signals. This angular orientation is defined in terms of the angle of departure, i.e., the angle between the direction of the transmitted beam and the axis of the transmitting access point (as defined by a line drawn through the locations of the transmitting antennas). This sort of measurement of angle of departure from the transmitter is in contrast to techniques that are known in the art for determining the angle of arrival of signals at the receiver. The angle of departure can be found, using the techniques described herein, even when the signals from the transmitting antennas are received via a single receiving antenna, such as the sort of omnidirectional antenna that is commonly installed in mobile telephones.

The embodiments of the present invention that are described hereinbelow specifically provide methods for finding the angle of departure of multiple signals that are transmitted respectively from multiple antennas of a wireless access point and are received at a given location. The transmitted signals encode, at least in part, identical data, with a predefined, per antenna, cyclic delay between the transmitted signals. The data are typically defined and transmitted in accordance with a known wireless communication standard, so that at least a part of the data, as well as the cyclic delay, are predictable. For example, the 802.11 standards specify a frame structure including a predefined preamble, which can be selected for processing by the receiver in the present context.

The receiver processes the received signals, using the known cyclic delay, in order to derive a measure of the actual phase shift between the signals. This phase shift, in turn, is indicative of the difference in path lengths that the signals traverse in reaching the receiver. The spacing between the transmitting antennas is also known: typically $\lambda/2$ (half the wavelength of the transmitted radio signals). Thus, based on the measure of the phase shift, along with the known distance between the antennas and the known amount of cyclic delay, it is possible to estimate the angle of departure of the signals from the wireless access point to the location of the receiver.

In some embodiments, the signals are multi-carrier signals, such as the sort of OFDM signals that are used in the 802.11n standard, and the cyclic delay is thus implemented by applying different, respective cyclic shifts to different antennas. In this case, the receiver is able to estimate the phase shift between the antennas by properly selecting two time-frequency bins in the received signals, and computing the measure of the phase shift using the respective cyclic shifts of bins as transmitted by the multiple antennas. By judicious selection of the bins, it is possible to compute the angle of departure by applying, for example, a simple linear transformation to the extracted frequency bins. For this purpose, it is advantageous that the bins be chosen, based on the cyclic delays defined by the applicable standard, so as to have antipodal cyclic shifts.

The term "time-frequency bin," as used in the context of the present description and in the claims, means a sample of the received signal at a given, predefined frequency taken at a given, predefined time from the start of a frame transmitted by the transmitter. Two time-frequency bins can be at the same frequency or different frequencies, and can occur at the same or different times. In 802.11 OFDM transmissions, for example, a bin is defined in terms of frequency as one of N predefined complex numbers used in data encoding prior to conversion to the time domain by Inverse Fast Fourier Transform (IFFT), such as N=64 for 20 MHz 802.11 OFDM. The input to the IFFT encoder in OFDM systems (which transforms frequency-domain to time-domain signals) is a fixed-size collection of complex numbers, each corresponding to a frequency bins.

Thus, in some embodiments (referred to as "time domain" embodiments), the two bins are defined by sampling a selected frequency within the multi-carrier encoding scheme at different, respective OFDM symbols, which are coded by different respective cyclic (time) shifts within a frame transmitted by the transmitter. In other embodiments (referred to as "frequency domain" embodiments), the two bins are defined by sampling two different frequencies within the multi-carrier encoding scheme at the same selected OFDM symbol within a transmitted frame.

Another advantage of the present techniques is that they are capable of receiving and processing the access point signals in a mobile station, in order to measure the angle of departure, without establishing an association between the mobile station and the access point. In other words, the mobile station can simply capture signals silently, without transmitting signals back to the access point, and can analyze the signals using the known, standard preamble structure and cyclic delay. The mobile station can apply this analysis, for example, to beacons that are transmitted by an access point, in accordance with certain 802.11 standards, even when there are no mobile stations communicating with the access point.

Alternatively, the mobile station can receive and analyze signals that are directed to other mobile stations.

Although the angle of departure itself does not uniquely identify the location of the transmitting access point, multiple measurements of angle of departure, from different, known receiver locations, can be used to find the access point location by triangulation. Thus, some embodiments of the present invention provide a method for mapping access point locations by combining multiple measurements of angle of departure made from different receiver locations. The signals transmitted by the access points also identify the access points (for example, by announcing the Basic Service Set Identifier—BSSID), so that the identity of each access point can be associated with its location.

By the same token, when the locations of access points are known, it is possible to find the location of a receiver by measuring the angles of departure from two or more of these known access points to the receiver, using the techniques described above. Thus, once the locations of access points in a certain area have been mapped, receivers, such as mobile telephones, can find their own locations accurately within the area based on the signals that they receive from the access points (even without associating or otherwise communicating back with the access points, as explained above). This sort of map of access points can thus be used for accurate and convenient geo-location without dependence on GPS, for example in indoor and urban locations.

Although the embodiments described hereinbelow relate, for the sake of concreteness and clarity, specifically to 802.11 wireless access points, the principles of the present invention may similarly be applied, mutatis mutandis, to other sorts of multi-antenna transmitters that transmit signals using multi-carrier encoding schemes. For example, in an alternative embodiment of the present invention, the receiver can be configured to measure angles of departure of multi-antenna cellular base stations that transmit OFDM signals in accordance with the applicable standards. All such alternative implementations of the present principles are considered to be within the scope of the present invention.

System Description

FIG. 1 is schematic, pictorial illustration of a system 20 for wireless communications and position finding, in accordance with an embodiment of the invention. By way of example, FIG. 1 shows a typically indoor or urban environment, in which multiple access points 22, 24, 26, ..., are deployed, often by different WLAN proprietors independently of one another. Signals from the access points are received by mobile stations 28, 30, ..., which are operated by users 32 who are free to move around within system 20. In the pictured embodiment, stations 28, 30, ..., are shown as smartphones; but other sorts of mobile devices, such as laptop and tablets computers, may be used in similar fashion and can similarly map angles of departure of access points 22, 24, 26, ..., as described hereinbelow.

Assuming access points 22, 24, 26, ..., in system 20 are compliant with the 802.11n standard, each access point has two or three antennas 34, as shown in FIG. 1. The principles of the present invention are similarly applicable to 802.11ac access points, which may have an even greater number of antennas. Mobile stations 28, 30, ..., are each assumed to have a single, omnidirectional antenna 36, although the techniques described herein for mapping angles of departure can similarly be implemented by multi-antenna stations.

Mobile stations 28, 30, ..., process signals received from antennas 34 in order to estimate the angles of departure of the signals from the respective access points 22, 24, 26, ..., as well as to extract identifying information (such as the BSSID) with regard to each access point. The mobile stations are able to perform these functions, as described further hereinbelow, without necessarily associating with the access points.

On the other hand, mobile stations 28, 30, ..., may associate with one or more of access points 22, 24, 26, ..., for purposes of Internet communications. Alternatively or additionally, the mobile stations may access the Internet via a cellular network or other connection. In any case, mobile stations 28, 30, ..., communicate the angle-of-departure data and access point identification that they collect via a network 38 to a mapping server 40. In addition, the mobile stations may communicate their current location coordinates to the mapping server, as derived, for example, from GPS signals or from known locations of access points or base stations that are provided by server. This information may be collected and reported autonomously and automatically by a suitable application program ("app") running in the background on the mobile stations.

Server 40 typically comprises a general-purpose computer, comprising a programmable processor 42 and a memory 44. The functions of server 40 that are described herein are typically implemented in software running on processor 42, which may be stored on tangible, non-transitory computer-readable media, such as optical, magnetic or electronic memory media.

Based on the angle-of-departure information, access point identification, and location coordinates communicated over network 38 by mobile stations 28, 30, ..., processor 42 builds up a map of access point locations and orientations in memory 44. As greater numbers of users 32 download the application program and convey information to server 40, the map will grow in both geographic extent and accuracy of the access point data, by a process of bootstrapping from an initial base of seed information. On the basis of this map, server 40 can also provide location and navigation information to users 32 via the application program running on their mobile stations, based on the access point signals received by the mobile stations at any given time.

Methods for Estimating Angle of Departure

Figure 2:
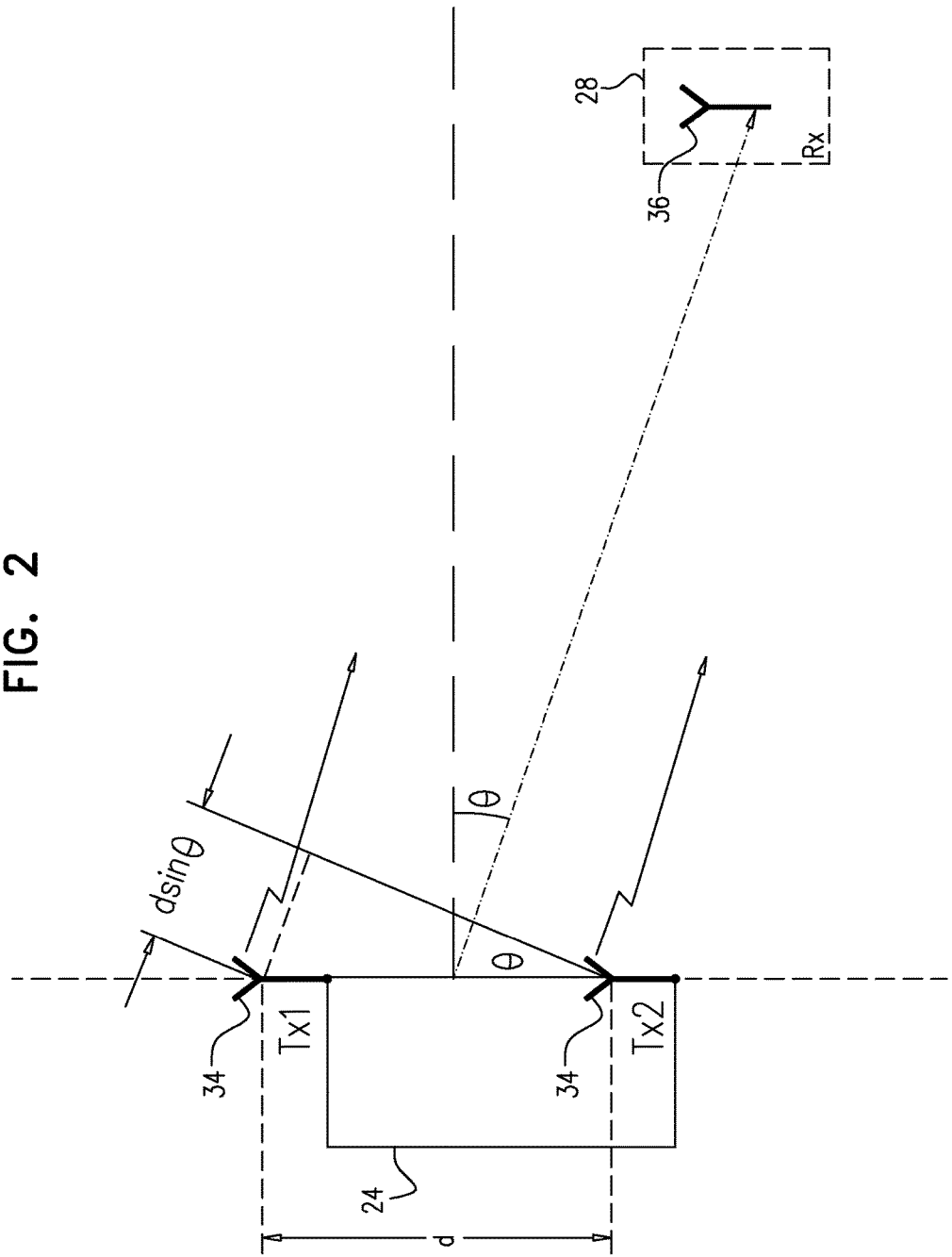
FIG. 2 is a diagram that schematically illustrates a coordinate frame used in deriving an angle of departure of wireless signals from an access point to a receiver, in accordance with an embodiment of the invention.

FIG. 2 is a diagram that schematically illustrates a coordinate frame used in deriving an angle of departure of wireless signals from access point 24 to mobile station 28, in accordance with an embodiment of the invention. This particular pair of access point and mobile station is selected purely for convenience, and similar principles will apply to any given pair. Although access point 24 is shown as having two antennas 34 (labeled Tx1 and Tx2), the same geometrical principles apply to access points having three or more antennas arranged in a linear array.

Antennas 34 define an array axis as the line passing through the bases of the antennas. The antennas are separated along the array axis by a known distance d, which is typically designed to be a half wavelength, for example, $\lambda/2=6.25$ cm at the standard WLAN frequency of 2.4 GHz. The angle of departure θ of the signals from antennas 34 to antenna 36 of mobile station 28 is taken relative to the normal to the array axis, as shown in FIG. 2. Assuming the distance from access point 24 to mobile station 28 to be considerably greater than d, there will be a difference of $d*\sin θ$ in the path length from Tx1 to antenna 36 (referred to as Rx) relative to the path length from Tx2.

As an example, assuming the length of the path from Tx2 to Rx is 6.0000 m, θ=30°, the slightly longer path from Tx1 to Rx will be 6.03125 m. This path difference translates into a 90° phase difference: $\Delta\phi=d\ \sin(\pi/6)=\lambda/2*\frac{1}{2}=\lambda/4$. The propagation delay across 6 m is L/C=6 m/(0.3 m/nsec)=20 nsec. Both paths, from Tx1 and Tx2, experience a linear phase shift as a function of frequency, which is assumed to be zero at $f_0=2.412$ GHz and linearly grows to $\phi=(360°\ *20$ nsec)/50 nsec=144° at $f_1=2.432$ GHz, wherein T=50 nsec=$\frac{1}{20}$ MHz is given by the difference B=20 MHz between the two frequencies. This linear phase shift of $\phi=144°$ between the two frequencies on both paths is in addition to the constant phase shift of 90° for the longer path at both frequencies, due to the path length difference. (Actually, the phase shifts, both linear and constant, are very slightly larger at 2.432 GHz, since the wavelength is very slightly longer, but this effect can be neglected since $B<<f_0$.)

In addition, in accordance with the 802.11n standard, different cyclic shifts will be applied to the OFDM signals transmitted by Tx2 relative to Tx1. A cyclic shift of Tcs<0 nanoseconds is equivalent to multiplying frequency bin k by $$e^{j\frac{2\pi}{N}nk},$$

wherein n=−B*Tcs, and N=64 is the number of frequency bins. It is advantageous to choose the bins, as explained below, to have an antipodal relation, given the standard cyclic shifts, meaning that there is a perfect 180° shift between Tx1 and Tx2 in the bin in question. Similarly, in three-antenna constellations, the standard specifies dissimilar cyclic shifts that are to be applied on Tx2 and Tx3 relative to Tx1. From the point of view of Rx antenna 36, there is no way of knowing in advance which antenna 34 is Tx1 and which is Tx2 (or Tx3). There are two possible physical constellations of two antennas (2Tx): (1,2) and (2,1), i.e., the antenna array may be flipped over relative to the receiver. There are six possible three-antenna (3Tx) constellations: (2,1,3), (1,2,3), (1,3,2) and their flip versions. In general, all possible constellations are taken into account in computing the angle of departure.

According to the 802.11 standards employing OFDM PHYs, data frames transmitted by access points have a preamble that includes a "Short Training Field" (STF) and a "Long Training Field" (LTF), containing predefined sequences of symbols that are specified by the standards.

The 802.11a standard defined a frame format that is now referred to as the "legacy" format, which includes a legacy (L) preamble with L-STF and L-LTF fields. The 802.11n standard defines a new format, known as "high-throughput" (HT), with HT-STF and HT-LTF fields. Access points operating in accordance with the 802.11n standard may transmit frames in either legacy mode, HT-mode ("greenfield"), or mixed mode, in which frames include both legacy and HT training fields.

The 802.11n standard defines the following cyclic shift values (Tcs) per transmitting antenna in the legacy and HT preambles (see Tables 20-9 and 20-10 in the standard). These Tcs values in turn give rise to different subcarrier phase shifts, in accordance with the formula presented above $$\left(e^{j\frac{2\pi}{N}nk}\right),$$

for different time-frequency bins (n,k), with N=64 for 20 MHz channels:

TABLE 1

| Legacy | HT | Tcs | n | k = 0 | k = 4 | k = 8 | k = 16 |
|---|---|---|---|---|---|---|---|
| Tx1 | Tx1 | 0 | 0 | 0 | 0 | 0 | 0 |
| Tx2 | — | −100 | 2 | 0 | π/4 | π/2 | π |
| Tx3 | Tx3 | −200 | 4 | 0 | π/2 | π | 2π |
| — | Tx2 | −400 | 8 | 0 | π | 2π | 4π |

Antipodality between the selected bins, i.e. 180° phase shift following CDD, provides the greatest Euclidean distance between the signals, thus enhancing noise immunity.

Embodiments of the present invention use two different methods to achieve antipodality:

(1) In the time domain method, a bin k0 in a legacy OFDM symbol and a bin k0 in an HT symbol are selected at a certain fixed frequency.

(2) In the frequency domain method, two bins are chosen at different frequencies in a single OFDM symbol, for example a legacy OFDM symbol.

Antipodality provides the best Euclidean distance for noise immunity.

Projecting the path differences between the antennas back to the transmitter antenna feeds, the phases of the two signals are (0, 0), or equivalently $(e^{j0}, e^{j\theta})$ in complex form, for the two-antenna case, and (−θ, 0, θ), equivalent to $(e^{-j\theta}, e^{j0}, e^{j\theta})$, in the three-antenna case, wherein θ is the angle of departure as shown in FIG. 2. Projecting post-IFFT encoder cyclic shifts onto the transmitter "frequency domain," for judiciously chosen shifts and bins, gives a phase of either 0 or 180°. The two or more rays emitted from the transmitter are superimposed at the single antenna of the receiver.

The combined effect of path propagation, cyclic shift and superposition is a signal of the form
$1 \pm e^{j\theta}$ for two antennas. For three antennas, there are two physically different cases: an anti-symmetrical case ("case I") and a symmetrical case ("case II"), yielding a combined signal of $e^{-j\theta} + 1 \pm e^{j\theta}$ or $e^{-j\theta} \pm 1 + e^{j\theta}$, respectively.

Returning now to the specific two-antenna example shown in FIG. 2 and the path phase differences calculated above, selecting natural exponents of jπ in the time domain (as indicated by the "π" entries in Table 1), the phase shifts between the signals received by antenna 36 from antennas 34 Tx1 and Tx2 at $f_0$=2.412 MHz in the L-LTF and HT-LTF fields of a mixed-mode frame will be as follows:

| Tx | L-LTF | HT-LTF |
|---|---|---|
| 1 | 0° | 0° |
| 2 | −90° | −90° + 180° |

In the above example, the difference of −90° in the antenna paths applies only to Tx2, while 180° is due to the cyclic shift, which is applied only to HT-LTF on Tx2.

The phases of the corresponding received signals at $f_1$=2.432 MHz will be:

| Tx | L-LTF | HT-LTF |
|---|---|---|
| 1 | 0° + 144° | 0° + 144° |
| 2 | −90° + 144° | −90° + 144° + 180° |

Here the additional 144° is due to the phase shift across the common path from transmitter to receiver, applied to all time slots.

Upon receiving the signals from the transmitted L-LTF bins in the frequency domain case, or both HT-LTF and L-LTF bins in the time domain case, from access point 24, mobile station 28 computes the phase difference between the Tx1 path and the Tx2 path. This difference is indicative, in turn, of the angle of departure of the signals from access point 24, as illustrated in FIG. 2. Computational methods that can be used to derive the angle of departure in this manner are described hereinbelow.

Figure 3:
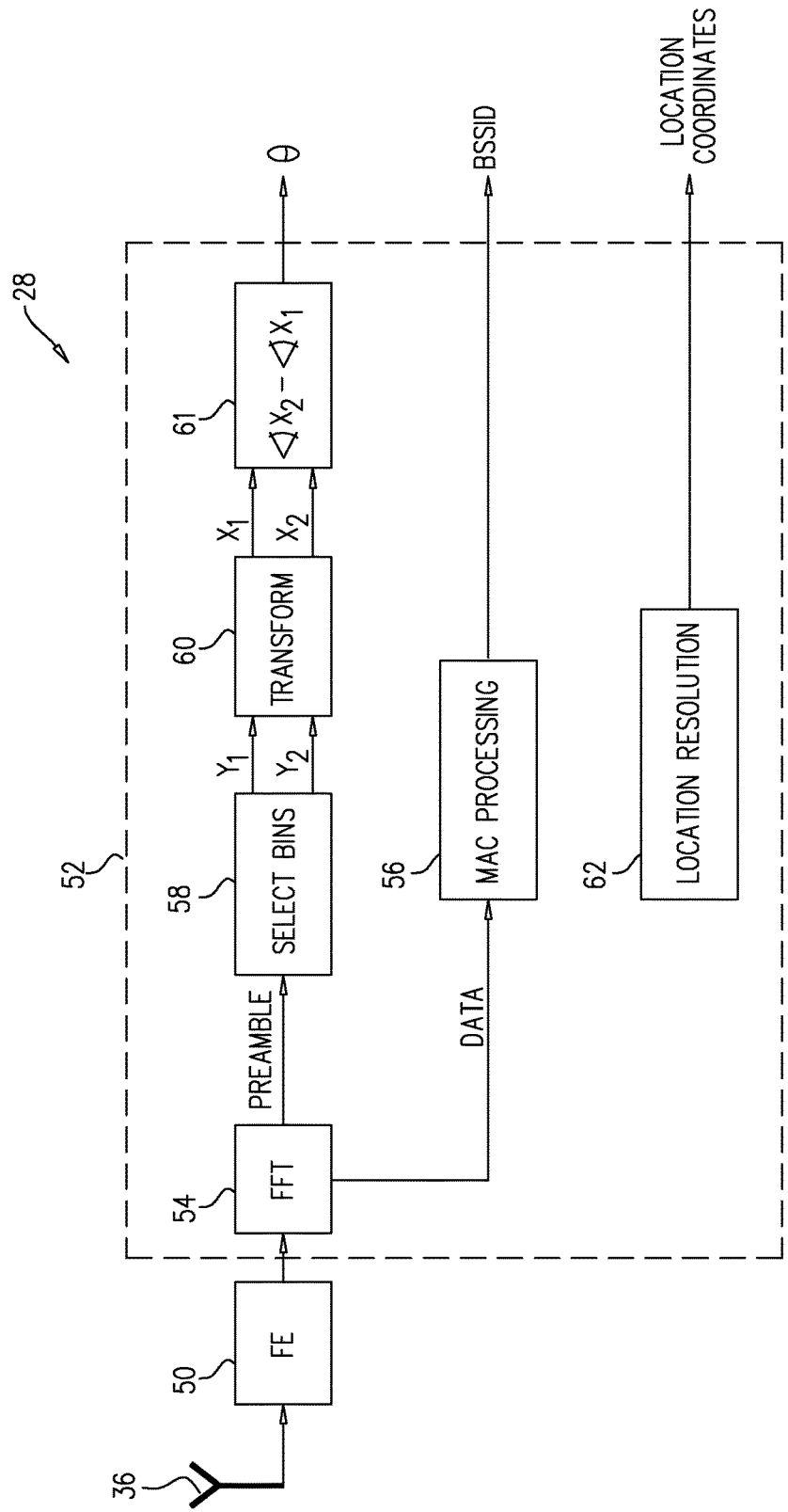
FIG. 3 is a block diagram that schematically illustrates components of a mobile receiver that are used in deriving coordinate information with respect to wireless access points, in accordance with an embodiment of the invention.

FIG. 3 is a block diagram that schematically illustrates components of mobile station 28 that are used in deriving coordinate information with respect to wireless access points, in accordance with an embodiment of the invention. The description that follows assumes that mobile station 28 has a single antenna 36, which receives the signal streams transmitted by two or three antennas 34 of an access point, but the principles of this embodiment may similarly be applied, mutatis mutandis, by a multi-antenna receiver in order to achieve path diversity while measuring the same angle of departure. As explained above, the analysis performed by mobile station relies on the fact that the signals transmitted from the different antennas encode identical data in the frame preambles, with a predefined cyclic delay between the transmitted signals as defined by the 802.11n standard.

A front end (FE) circuit 50 in mobile station 28 amplifies, filters, and digitizes the signals received by antenna 36, as is known in the art, and passes the resulting digital samples to digital processing circuitry 52. A fast Fourier transform (FFT) circuit 54 in circuitry 52 divides the incoming signal into time-frequency bins (n,k), wherein each frequency corresponds to a different OFDM subcarrier, and the phase of the signal component in each bin is determined by the data value that it encodes. A media access control (MAC) processing circuit 56 extracts data from the frame header, including the BSSID that identifies the access point that transmitted the frame. Circuits 50, 54 and 56, as well as other components of digital processing circuitry 52, are conventional elements of 802.11 receivers, such as those installed in WiFi-capable smartphones that are known in the art for purposes of data reception and transmission. Other elements of the receiver that are not essential for an understanding of the present invention are omitted for the sake of brevity.

The signal complex frequency bins generated by FFT circuit 54 are input to an angle estimation block, which includes a bin selector 58 and a transformation module 60 and an angle differentiator 61. These elements convert the complex values into an estimated angle of departure. They are typically implemented in software running on a programmable processor in mobile station 28. This software may be a part of an application program running on the mobile station, as described above, along with other functions performed by a processor already present in the mobile station. This program may be stored in tangible, non-transitory computer-readable media, such as optical, magnetic, or electronic memory media. Alternatively or additionally, at least a part of the angle estimation functions described herein may be performed by in dedicated or programmable hardware logic.

Bin selector 58 selects a pair of time-frequency bins, $(n_1,k_1)$ and $(n_2,k_2)$, to be extracted from the preambles of the received signals, and extracts the corresponding phase values. For each bin, the bin selector computes the complex vectors, $y_i$, between the respective signals received from two of antennas 34. The two selected complex bins define a complex vector $$\vec{y} = \begin{bmatrix} y_1 \\ y_2 \end{bmatrix},$$

which is input to complex transformation module 60. Although any pair of bins can be chosen for this purpose, it is advantageous to choose a pair, based on the known cyclic shifts, in which the relative phase delay can be linearly related to the angle of departure of the signals transmitted from the access point across a broad span of angles.

The choice of the difference between the frequencies of the bins, $\Delta k = k_1 - k_2$, involves a tradeoff between thermal noise, which can be significant for small $\Delta k$, and channel deviations and sensitivity to time of flight, which grow as $\Delta k$ grows. The numerical examples provided here assume cyclic shifts are chosen so as to achieve antipodality. The frequency response of the wireless channel between the access point and the receiver is not linear in phase, due, for example, to the impact of reflections. In general, the larger the value of $\Delta k$, the larger the added error to the estimated phase delay due to variation in the channel response. In the case of 802.11n signals with 20 MHz bandwidth, for example, a reasonable tradeoff is achieved with $\Delta k=8$, which reflects a frequency difference of 8/64*20 MHz=2.5 MHz. The following frequency combinations $(k_1,k_2)$ satisfy this criterion: (0,8), (16,8), (16,24), (32,40), (48,40), (48,56) and (0,56). Since the HT-LTF does not populate frequencies 0 and 32, however, the combinations (0,8) and (32,40) are not applicable. Other bin pair patterns of the form $(k_0,k_{0+8})$ can be used, as well, so long as both preamble bins carry energy.

Transformation module 60 applies a linear transformation T in order to convert the complex input vector into an output vector: $\vec{x}=T\vec{y}$. The purpose of this transformation is to generate the pair of values $$\vec{x} = \begin{bmatrix} x_1 \\ x_2 \end{bmatrix}$$

such that the phases of $x_1$ and $x_2$ can be easily extracted and subtracted by differentiator 61 to give the estimated angle of departure: $\hat{\theta}=\arg(x_2)-\arg(x_1)$.

For example, in the case of two antenna elements the following transformation provides linear estimation of the output vector:

$$\vec{x} = \begin{bmatrix} 1 & 1 \\ 1 & -1 \end{bmatrix} \vec{y}$$

[ ]Mobile station 28 transmits the estimated angle of departure, along with the BSSID extracted by MAC processing circuit 56, via network 38 to server 40. In addition, mobile station 28 transmits information regarding the current location of the mobile station to server 40, as provided by a location resolution module 62. Module 62 may comprise, for example, a GPS receiver, which outputs location coordinates based on satellite signals. Additionally or alternatively, module 62 may be implemented in software running on a processor in processing unit 52 and may compute current location coordinates of mobile station 28 based on signals received from other, known access points that have already been mapped by server 40, or other sources. In any case, server 40 receives the estimated angle of departure data together with the current, estimated location of the mobile station. The server is thus able to find the actual location of access point 24 based on multiple angle measurements reported by mobile station 28 (or by multiple mobile stations) from different locations.

Examples of Angle of Departure Estimation

Two Antennas, Mixed Format (MF, HT with Legacy Compliance) Mode

A plausible "time domain" choice of a time-frequency pair of bins in the case of two transmitting antennas is $(n,k)=(4,k_0)$ and $(8,k_0)$, wherein $k_0$ is any element in the set $\{8,24,40,56\}$. This choice provides antipodality, i.e., the phase contribution of the cyclic shift is either 0 or 180°. The time bin n=4 is in the legacy preamble (L-LTF), while bin n=8 (400 nsec*20 MHZ) is in the HT preamble (HT-LTF). (The bin n=4 corresponds to 200 ns*20 MHZ, wherein 200 ns is the CDD mandated by the standard, and 20 MHz is a typical 802.11 OFDM channel bandwidth. Channel bandwidths of 40 MHz, 80 MHz and 160 MHz are possible, as well.) This selection of bins generates antipodal phases between the two readings, i.e., summing (or equivalently, subtracting) the signals from the two antennas in the measured bins gives the complex vector $$\vec{y} = \begin{bmatrix} 1 + e^{j\phi} \\ 1 - e^{j\phi} \end{bmatrix}.$$

Transformation module 60 transforms this vector linearly into $$\vec{x} = \begin{bmatrix} 1 & 1 \\ 1 & -1 \end{bmatrix} \vec{y} = 2 \begin{bmatrix} 1 \\ e^{-j\phi} \end{bmatrix}.$$

Hence the estimated angle of departure is $\hat{\theta}=\arg(x_2)-\arg(x_1)=\phi$.

Three Antennas, MF Mode

Case I

The same time-frequency bins are selected as in the previous example, assuming that antennas 34 are arrayed along the axis of the transmitting access point in the order (1,3,2) or (2,1,3) or in the flip versions of these orders. In all of these cases, extraction of the phases from the pairs of bins $(n,k)=(4,k_0)$ and $(8,k_0)$ will yield the following complex vector:

$$\vec{y} = \begin{bmatrix} e^{-j\phi} + 1 + e^{j\phi} \\ e^{-j\phi} + 1 - e^{j\phi} \end{bmatrix}.$$

The reason for this result is that antennas Tx1 and Tx3 have the same cyclic shift (n=4), while Tx2 has a cyclic shift of n=8, which for the above set of values of $k_0$ results in a complete 180° rotation.

Applying the same transformation in module 60 as in the preceding example results in the angular vector:

$$\vec{x} = \begin{bmatrix} 1 & 1 \\ 1 & -1 \end{bmatrix} \vec{y} = 2 \begin{bmatrix} 1 + e^{-j\phi} \\ e^{j\phi} \end{bmatrix} = e^{-j\frac{\phi}{2}} \begin{bmatrix} e^{-j\frac{\phi}{2}} + e^{j\frac{\phi}{2}} \\ e^{j\frac{3\phi}{2}} \end{bmatrix} = e^{-j\frac{\phi}{2}} \begin{bmatrix} \cos\frac{\phi}{2} \\ e^{j\frac{3\phi}{2}} \end{bmatrix}.$$

Hence, $$\hat{\theta} = \arg(x_2) - \arg(x_1) = \frac{3\phi}{2}.$$

Case II

The array constellation of (1,2,3) and its flip case result in the following phase vector:

$$\vec{y} = \begin{bmatrix} e^{-j\phi} + 1 + e^{j\phi} \\ e^{-j\phi} - 1 + e^{j\phi} \end{bmatrix}.$$

In this case, module 60 applies the transformation $$\vec{x} = \begin{bmatrix} 1 & -j \\ 1 & j \end{bmatrix} \vec{y},$$

which generates a non-linear S-curve of angle as a function of phase, spanning $$\frac{3\pi}{2}.$$

The curve is symmetrical around the boresight direction (i.e., the direction perpendicular to the array axis shown in FIG. 2). In other words, for a given phase delay, the angle of departure has a unique, corresponding absolute value, with a sign that can be either positive or negative.

Similar results can be obtained by a frequency domain analysis: When using different frequency bins of the HT-LTF, the signal from each antenna is cyclically shifted by a different delay, as shown in Table 1 above. The case of $\Delta k=8$ is identical in phase shifts to the three-antenna time-domain case analyzed above, with phase shifts of 0 and $\pi$:

| $e^{j\frac{2\pi}{N}nk}$ | n | Tcs | k = 16 | k = 8 |
|---|---|---|---|---|
| $e^{-j\theta}$ | 0 | 0 | 1 | 1 |
| $e^{j0}$ | 8 | −400 | 1 | 1 |
| $e^{+j\theta}$ | 4 | −200 | 1 | −1 |

The bins $(n,k)=(8,0)$ and $(n,k)=(8,8)$ result in the same phase combination as the above time domain case I: $\vec{y} =$ $$\begin{bmatrix} e^{-j\phi} + 1 + e^{j\phi} \\ e^{-j\phi} + 1 - e^{j\phi} \end{bmatrix},$$

with the same angle estimator as above. The resultant estimator is perfectly linear with output span of $3\pi$, and a full span set at a slant of $\pi$.

Three Antennas, Legacy Mode

In legacy mode, access point 24 periodically transmits beacons, typically roughly every 100 msec. Therefore, mobile station 28 can advantageously receive and process these beacons to find the angle of departure of access point 24, since the beacons are transmitted irrespectively of any association by a mobile station. Furthermore, because beacons are always sent with a bandwidth of 20 MHz, the receiver can be agnostic to the actual bandwidth that is used for data (which may be 20, 40, 80 or 160 MHz, for example).

In the case of the L-LTF, the cyclic shift relative to Tx1 is 100 ns for Tx2 and 200 ns for Tx3, respectively:

| | n | Tcs | k = 0 | k = 16 |
|---|---|---|---|---|
| $e^{-j\theta}$ | 0 | 0 | 1 | 1 |
| $e^{j0}$ | 2 | −100 | 1 | −1 |
| $e^{+j\theta}$ | 4 | −200 | 1 | 1 |

Hence for $\Delta k=16$ (double the frequency offset $\Delta k=8$ used above for HT), the phase pattern is identical to Case I above.

Antenna Constellation

The transformations described above, when applied by transformation module 60, give estimates of the angle of departure but do not necessarily resolve the actual configuration of the transmit antenna constellation. Digital processing unit 52 may therefore apply an additional, parallel estimator in order to differentiate between one, two and three transmitting antennas, and in the case of three antennas, to differentiate between Case I and Case II defined above.

In one embodiment of the present invention, transformation module 60 extracts the antenna constellation by applying a different linear transformation in the time domain: No transformation in the three-antenna Case II results in an output difference of either 0 or $\pi$ at any direction of departure. In the case of two antennas, the following transformation results in an output difference of either 0 or $\pi$ at any direction of departure:

$$\vec{x} = \begin{bmatrix} 1 & -j \\ 1 & j \end{bmatrix} \vec{y}.$$

A second method to ascertain the number of antenna elements and their linear formation is based on using a plurality of time-frequency pairs (n, k), all of which provide an unbiased time of departure estimation. For example, in the frequency domain method described above with bins $(n,k_0)$ and $(n,k_{0+8})$, values of $k_0=0, 1, 2, \ldots, 55$ can be used for bins bearing energy n=4 and N=64.

It is not generally possible to determine whether in the two-antenna case, the antenna order is (1,2) or (2,1). The ambiguity of order can be readily resolved, however, by making multiple measurements of angle of departure, using the same receiver or multiple different receivers at different locations.

Three-antenna transmitters can readily be distinguished from two-antenna transmitters using the techniques described above: Since different cyclic delays are used in two- and in three-antenna devices, reception and processing of a single MF packet is sufficient to apply a crosscheck between the above time-domain and frequency-domain estimations. Only the correct antenna estimator (two-antenna or three-antenna) will give the same results for both the time-domain and frequency-domain estimations.

System Applications

Figure 4:
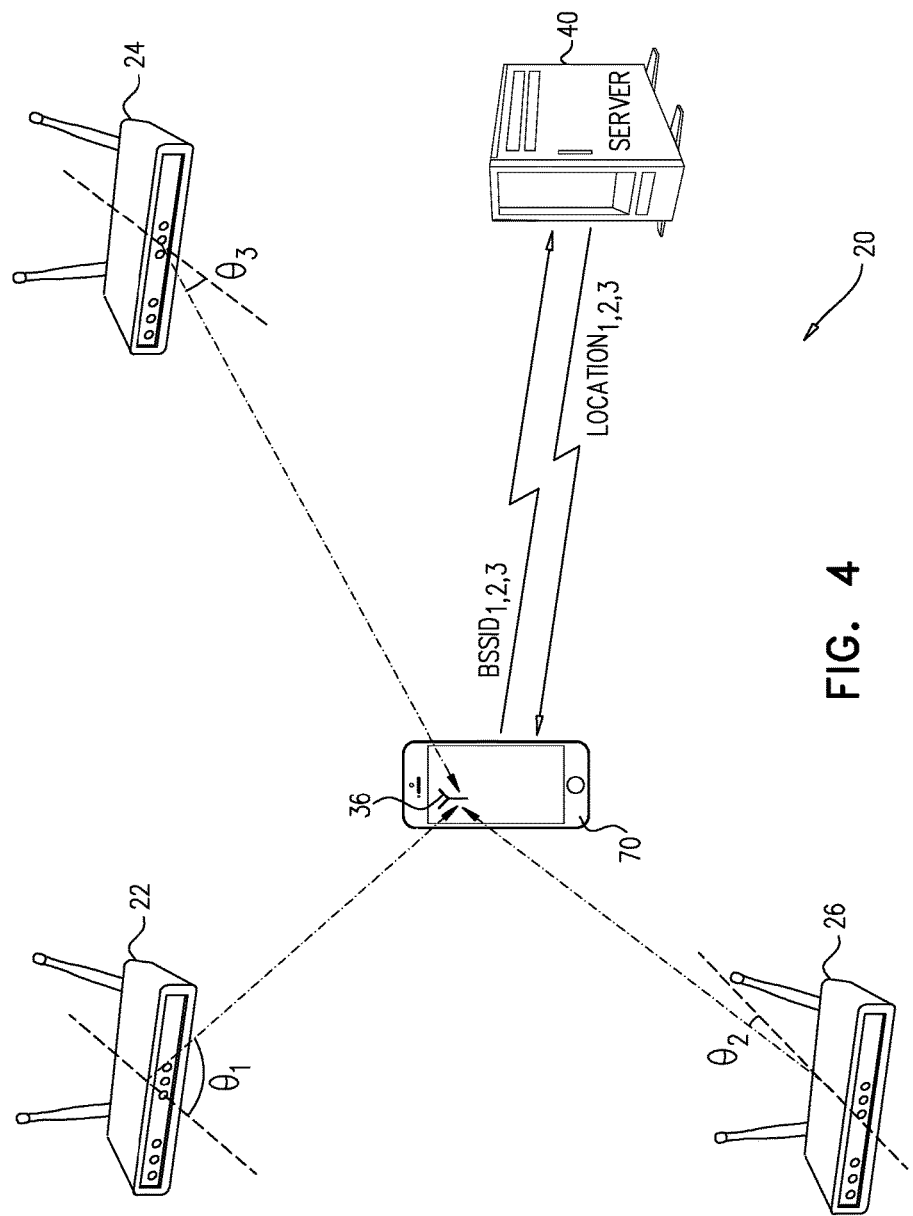
FIG. 4 is a schematic, pictorial illustration of components of the system of FIG. 1, illustrating a method for finding the position of a mobile communication device, in accordance with an embodiment of the invention.

FIG. 4 is a schematic, pictorial illustration of components of the system of FIG. 1, illustrating a method for finding the position of a mobile communication device 70, in accordance with an embodiment of the invention. This method assumes that the respective location coordinates and BSSIDs of access points 22, 24 and 26 have already been mapped by server 40, on the basis of measurements of angle of departure that were made previously by other mobile stations and/or other input data.

Device 70 receives multi-antenna signals from each of access points 22, 24 and 26 and extracts the respective angle of departure for each access point, labeled $\theta_1$, $\theta_2$, and $\theta_3$ in the figure, using the techniques described above, along with the respective BSSIDs. Device 70 reports these findings via network 38 to server 40, which returns corresponding location coordinates. The server may return the location coordinates of the access points, in which case device 70 can triangulate its own position based on these coordinates and the measured angles of departure. Alternatively or additionally, device 70 conveys the values of the angles of departure that it has estimated to server 40, which then returns the location coordinates of device 70.

In order to provide these sorts of location data to device 70, server 40 builds up and maintains a map of access point locations and orientations in memory 44 (FIG. 1). Typically, the map is built up on the basis of measurements of angle of departure, BSSID, and device location that are reported by mobile stations in various areas. Server 40 may use the information reported by device 70, as illustrated in FIG. 4, not only to provide location information to device 70, but also to extend and refine the map maintained by the server. In this manner, for example, the server can continually add new access points to the map and can refine the accuracy of the access point locations and orientations in the map.

Server 40 can build this access point map without requiring any cooperation by operators of the access points. Similarly once users of mobile devices have installed the mapping application, their mobile devices can measure and report access point data to the server autonomously, without active user involvement. The more users subscribe to the mapping application, the more extensive and more accurate will be the resulting maps and access point locations that they provide.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for signal processing, comprising:
    receiving at a given location at least first and second signals transmitted respectively from at least first and second antennas of a wireless transmitter, the at least first and second signals encoding identical data using a multi-carrier encoding scheme with a predefined cyclic delay between the transmitted signals;
    processing the received first and second signals, using the cyclic delay, in order to derive a measure of a phase delay between the first and second signals,
    wherein processing the received first and second signals comprises selecting at least two time-frequency bins in the received signals, and computing the measure of the phase delay responsively to respective cyclic shifts of the selected bins; and
    based on the measure of the phase delay, estimating an angle of departure of the first and second signals from the wireless access point to the given location.

2. The method according to claim 1, wherein receiving the at least first and second signals comprises receiving at least the first and second signals via a single receiving antenna.

3. The method according to claim 2, wherein the single receiving antenna is an omnidirectional antenna installed in a mobile telephone.

4. The method according to claim 1, wherein the multi-carrier encoding scheme comprises an orthogonal frequency-domain multiplexing (OFDM) scheme.

5. The method according to claim 4, wherein the transmitter is a wireless access point operating in accordance with an 802.11 standard.

6. The method according to claim 1, wherein selecting the at least two time-frequency bins comprises sampling first and second bins at a selected frequency within the multi-carrier encoding scheme in different, respective first and second symbols within a frame transmitted by the transmitter.

7. The method according to claim 1, wherein selecting the at least two time-frequency bins comprises sampling first and second bins at different, respective first and second frequencies within the multi-carrier encoding scheme in a selected symbol within a frame transmitted by the transmitter.

8. The method according to claim 1, wherein selecting the at least two time-frequency bins comprises selecting first and second bins having antipodal phases based on standard cyclic shifts.

9. The method according to claim 1, wherein computing the measure of the phase delay comprises applying a linear transformation to the signals extracted from the selected time-frequency bins.

10. The method according to claim 1, wherein the first and second signals are transmitted in accordance with a wireless communication standard that specifies a frame structure including a predefined preamble, and wherein processing the received first and second signals comprises selecting at least a part of the preamble of a given frame for processing.

11. The method according to claim 1, wherein receiving and processing the at least first and second signals comprise receiving and processing at least the first and second signals in a mobile station without establishing an association between the mobile station and the access point.

12. The method according to claim 1, and comprising receiving location information with respect to the wireless access point, and computing coordinates of the given location based on the received location information and the estimated angle of departure.

13. The method according to claim 1, and comprising extracting an identifier of the wireless access point from at least one of the received first and second signals.

14. A method for signal processing, comprising:
receiving at a given location at least first and second signals transmitted respectively from at least first and second antennas of a wireless transmitter, the at least first and second signals encoding identical data using a multi-carrier encoding scheme with a predefined cyclic delay between the transmitted signals;
processing the received first and second signals, using the cyclic delay, in order to derive a measure of a phase delay between the first and second signals,
wherein receiving and processing the at least first and second signals comprise receiving and processing at least the first and second signals in a mobile station without establishing an association between the mobile station and the access point, and
wherein receiving and processing at least the first and second signals comprises receiving a beacon transmitted from the at least first and second antennas in accordance with a predefined wireless communication standard; and
based on the measure of the phase delay, estimating an angle of departure of the first and second signals from the wireless access point to the given location.

15. A method for signal processing, comprising:
receiving at a given location at least first and second signals transmitted respectively from at least first and second antennas of a wireless transmitter, the at least first and second signals encoding identical data using a multi-carrier encoding scheme with a predefined cyclic delay between the transmitted signals;
receiving location information with respect to the wireless access point, and computing coordinates of the given location based on the received location information and the estimated angle of departure,
wherein computing the coordinates comprises finding the coordinates based on the received location information and the estimated angle of departure with respect to two or more different wireless access points;
processing the received first and second signals, using the cyclic delay, in order to derive a measure of a phase delay between the first and second signals; and
based on the measure of the phase delay, estimating an angle of departure of the first and second signals from the wireless access point to the given location.

16. A method for signal processing, comprising:
receiving at a given location at least first and second signals transmitted respectively from at least first and second antennas of a wireless transmitter, the at least first and second signals encoding identical data using a multi-carrier encoding scheme with a predefined cyclic delay between the transmitted signals;
processing the received first and second signals, using the cyclic delay, in order to derive a measure of a phase delay between the first and second signals;
based on the measure of the phase delay, estimating an angle of departure of the first and second signals from the wireless access point to the given location;
extracting an identifier of the wireless access point from at least one of the received first and second signals; and
reporting the identifier and the estimated angle of departure to a server, for incorporation into a map containing respective locations of multiple access points.

17. A wireless device, comprising:
a receive antenna, configured to receive at a given location at least first and second signals transmitted respectively from at least first and second antennas of a wireless transmitter, the at least first and second signals encoding identical data using a multi-carrier encoding scheme with a predefined cyclic delay between the transmitted signals; and
processing circuitry, which is configured to process the received first and second signals, using the cyclic delay, in order to derive a measure of a phase delay between the first and second signals, and to estimate, based on the measure of the phase delay, an angle of departure of the first and second signals from the wireless access point to the given location,
wherein the processing circuitry is configured to select at least two time-frequency bins in the received signals, and to compute the measure of the phase delay responsively to respective cyclic shifts of the selected bins.

18. The device according to claim 17, wherein the receive antenna comprises a single antenna, which receives both the first and second signals.

19. The device according to claim 18, wherein the single antenna is an omnidirectional antenna, and the device is a mobile telephone.

20. The device according to claim 17, wherein the multi-carrier encoding scheme comprises an orthogonal frequency-domain multiplexing (OFDM) scheme.

21. The method according to claim 20, wherein the transmitter is a wireless access point operating in accordance with an 802.11 standard.

22. The device according to claim 17, wherein the at least two time-frequency bins comprise first and second bins at a selected frequency within the multi-carrier encoding scheme, occurring in different, respective first and second symbols within a frame transmitted by the transmitter.

23. The device according to claim 17, wherein the at least two time-frequency bins comprise first and second bins at different, respective first and second frequencies within the multi-carrier encoding scheme, occurring in a selected symbol within a frame transmitted by the transmitter.

24. The device according to claim 17, wherein the at least two time-frequency bins are selected so as to have antipodal phases based on standard cyclic shifts.

25. The device according to claim 17, wherein the processing circuitry is configured to apply a linear transformation to the signals extracted from the selected time-frequency bins in order to estimate the angle of departure.

26. The device according to claim 17, wherein the first and second signals are transmitted in accordance with a wireless communication standard that specifies a frame structure including a predefined preamble, and wherein the processing circuitry is configured to select at least a part of the preamble of a given frame for processing.

27. The device according to claim 17, wherein the processing circuitry is configured to receive and process at least the first and second signals without establishing an association with the access point.

28. The device according to claim 17, wherein the processing circuitry is configured to receive location information with respect to the wireless access point, and to compute coordinates of the given location based on the received location information and the estimated angle of departure.

29. The device according to claim 17, wherein the processing circuitry is configured to extract an identifier of the wireless access point from at least one of the received first and second signals.

30. A wireless device, comprising:
- a receive antenna, configured to receive at a given location at least first and second signals transmitted respectively from at least first and second antennas of a wireless transmitter, the at least first and second signals encoding identical data using a multi-carrier encoding scheme with a predefined cyclic delay between the transmitted signals; and
- processing circuitry, which is configured to process the received first and second signals, using the cyclic delay, in order to derive a measure of a phase delay between the first and second signals, and to estimate, based on the measure of the phase delay, an angle of departure of the first and second signals from the wireless access point to the given location,
- wherein the processing circuitry is configured to receive and process at least the first and second signals without establishing an association with the access point, and
- wherein the first and second signals comprise a beacon transmitted from the at least first and second antennas in accordance with a predefined wireless communication standard.

31. A wireless device, comprising:
- a receive antenna, configured to receive at a given location at least first and second signals transmitted respectively from at least first and second antennas of a wireless transmitter, the at least first and second signals encoding identical data using a multi-carrier encoding scheme with a predefined cyclic delay between the transmitted signals; and
- processing circuitry, which is configured to process the received first and second signals, using the cyclic delay, in order to derive a measure of a phase delay between the first and second signals, and to estimate, based on the measure of the phase delay, an angle of departure of the first and second signals from the wireless access point to the given location;
- wherein the processing circuitry is configured to receive location information with respect to the wireless access point, and to compute coordinates of the given location based on the received location information and the estimated angle of departure, and
- wherein the processing circuitry is configured to compute the coordinates based on the received location information and the estimated angle of departure with respect to two or more different wireless access points.

32. A wireless device, comprising:
- a receive antenna, configured to receive at a given location at least first and second signals transmitted respectively from at least first and second antennas of a wireless transmitter, the at least first and second signals encoding identical data using a multi-carrier encoding scheme with a predefined cyclic delay between the transmitted signals; and
- processing circuitry, which is configured to process the received first and second signals, using the cyclic delay, in order to derive a measure of a phase delay between the first and second signals, and to estimate, based on the measure of the phase delay, an angle of departure of the first and second signals from the wireless access point to the given location,
- wherein the processing circuitry is configured to extract an identifier of the wireless access point from at least one of the received first and second signals, and
- wherein the processing circuitry is configured to report the identifier and the estimated angle of departure to a server, for incorporation into a map containing respective locations of multiple access points.

* * * * *